United States Patent
Tang et al.

(10) Patent No.: US 12,474,718 B1
(45) Date of Patent: Nov. 18, 2025

(54) UNDERCARRIAGE IMAGING ROVER

(71) Applicant: Copart, Inc., Dallas, TX (US)

(72) Inventors: Victor Tang, Flower Mound, TX (US); Priyam Dalwadi, Addison, TX (US); Raveena Jadhav, Addison, TX (US); Akshay Ganesh, Addison, TX (US); William An, Arlington, TX (US); Nikhil Ajay Kadalge, Irving, TX (US)

(73) Assignee: Copart, Inc., Dallas, TX (US)

( * ) Notice: Subject to any disclaimer, the term of this patent is extended or adjusted under 35 U.S.C. 154(b) by 0 days.

(21) Appl. No.: 19/201,405

(22) Filed: May 7, 2025

(51) Int. Cl.
*G05D 1/227* (2024.01)
*G05D 1/222* (2024.01)
*G06T 7/00* (2017.01)

(52) U.S. Cl.
CPC .......... *G05D 1/2279* (2024.01); *G05D 1/222* (2024.01); *G06T 7/0004* (2013.01); *G06T 2207/10016* (2013.01)

(58) Field of Classification Search
CPC .... G05D 1/222; G05D 1/2279; G06T 7/0004; G06T 2207/10016
See application file for complete search history.

(56) References Cited

U.S. PATENT DOCUMENTS

| | | | | |
|---|---|---|---|---|
| 6,075,905 A | * | 6/2000 | Herman | H04N 19/597 348/588 |
| 6,856,344 B2 | * | 2/2005 | Franz | G01N 21/8806 348/143 |
| 2011/0043604 A1 | * | 2/2011 | Peleg | G06T 3/4038 348/E7.001 |
| 2012/0293607 A1 | * | 11/2012 | Bhogal | G06T 3/4038 348/E5.051 |
| 2014/0074292 A1 | * | 3/2014 | Sawada | G05D 1/00 700/259 |
| 2023/0032491 A1 | * | 2/2023 | Bandikatla | G05D 1/0094 |
| 2024/0267638 A1 | * | 8/2024 | Park | B25J 9/10 |

* cited by examiner

*Primary Examiner* — Jason Holloway
*Assistant Examiner* — Blake A Wood

(57) ABSTRACT

An apparatus for scanning an undercarriage of a vehicle including a rover for moving back and forth under the vehicle. At least one processor generates control signals to control movement of the rover and to control capture of a video of the undercarriage of the vehicle. A drive system responsive to the control signals from the processor moves the rover back and forth under the vehicle. A camera captures a video and images of the undercarriage of the vehicle as the rover moves under the vehicle in a first direction. The at least one processor is further configured to process the video to generate a single image of the undercarriage of the vehicle.

20 Claims, 14 Drawing Sheets

UNDERCARRIAGE IMAGING ROVER

TECHNICAL FIELD

The present invention relates generally to a system for scanning the undercarriage of a vehicle, and more particularly, to a system for providing an image of the undercarriage of the vehicle.

BACKGROUND

Within the vehicle insurance industry, there is a need for scanning vehicles for damage in order to provide reasonable estimates of the salvage value of the vehicle based upon existing damage to the vehicle. One manner for providing these type of damage estimates involves an individual visually scanning the vehicle and providing an estimate for the vehicle based on the observed damages. However, manual inspections can require a great deal of time in order to fully examine a vehicle and there may be difficulties in assessing damages in certain areas of the vehicle such as the undercarriage which are difficult to get under and observe potential damages. Thus, there is a need for the ability to scan the undercarriage of the vehicle in a quick and efficient fashion that would enable the creation of images from which damage estimates to the vehicle may be provided.

SUMMARY

The present invention, as disclosed and described herein, in one aspect thereof, comprises an apparatus for scanning an undercarriage of a vehicle including a rover for moving back and forth under the vehicle. At least one processor generates control signals to control movement of the rover and to control capture of a video of the undercarriage of the vehicle. A drive system responsive to the control signals from the processor moves the rover back and forth under the vehicle. A camera captures a video and images of the undercarriage of the vehicle as the rover moves under the vehicle in a first direction. The at least one processor is further configured to process the video to generate a single image of the undercarriage of the vehicle.

BRIEF DESCRIPTION OF THE DRAWINGS

For a more complete understanding, reference is now made to the following description taken in conjunction with the accompanying Drawings in which.

DETAILED DESCRIPTION

Figure 1:
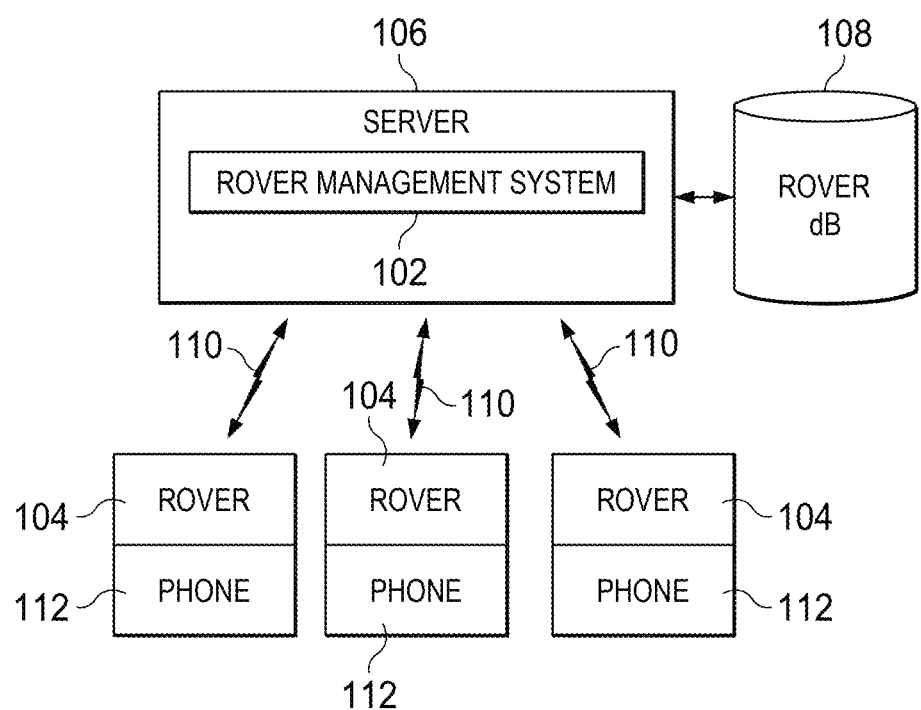
FIG. 1 illustrates a block diagram of a system utilizing rovers to scan the undercarriage of a vehicle and provide images thereof.

Referring now to the drawings, wherein like reference numbers are used herein to designate like elements throughout, the various views and embodiments of undercarriage imaging rover are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a block diagram of a rover management system 102 and a plurality of rovers 104. The rover management system 102 is implemented within a server 106 that may control multiple rovers 104. The rover management system 102 stores information relating to the multiple rovers 104 within a rover database 108 that may be stored in any type of memory. The rovers 104 wirelessly communicate via wireless communications links 110 with the rover management system 102. Each rover 104 has associated therewith a mobile telephone 112. The mobile telephone 112 and rover 104 are wirelessly linked with each other after an authentication procedure as will be described more fully herein below. The rover 104 and the rover management system 102 communicate over the wireless communications link 110. This enables information that is processed and generated by the rover 104 or an app 113 implemented on the mobile telephone 112 with respect to the undercarriage of the vehicle to be generated at the rover 104 and transmitted from the rover using the wireless communication link 110 between the mobile telephone 112 and the rover management system 102. The information received over the wireless communications link 110 with respect to a particular rover 104 may be stored by the rover management system 102 within the rover database 108. The rover management system 102 may additionally store within the rover database 108 the particular stacked images that are created at the rover 104 by the app 113 on the mobile telephone 112 and transmitted to the rover management system 102.

The rover management system 102 on the server 106 is a centralized platform that keeps track of each rover's identity, health and firmware version. By leveraging over-the-air (OTA) capabilities, the firmwarecan be updated without needing physical intervention. The server 106 merely sends the new code for the update in small, encrypted chunks, and once fully received, the server 106 validates and flashes the update to the rover 104. This makes it possible to deploy software updates or bug fixes to multiple rovers 104 spread across different sites. Using the seamless blend of secure information, continuous data reporting and remote control, the firmware within the microcontroller 212 transforms the rover 104 from a collection of electronics into an intelligent network machine that can be managed and upgraded throughout its operational life.

Figure 2:
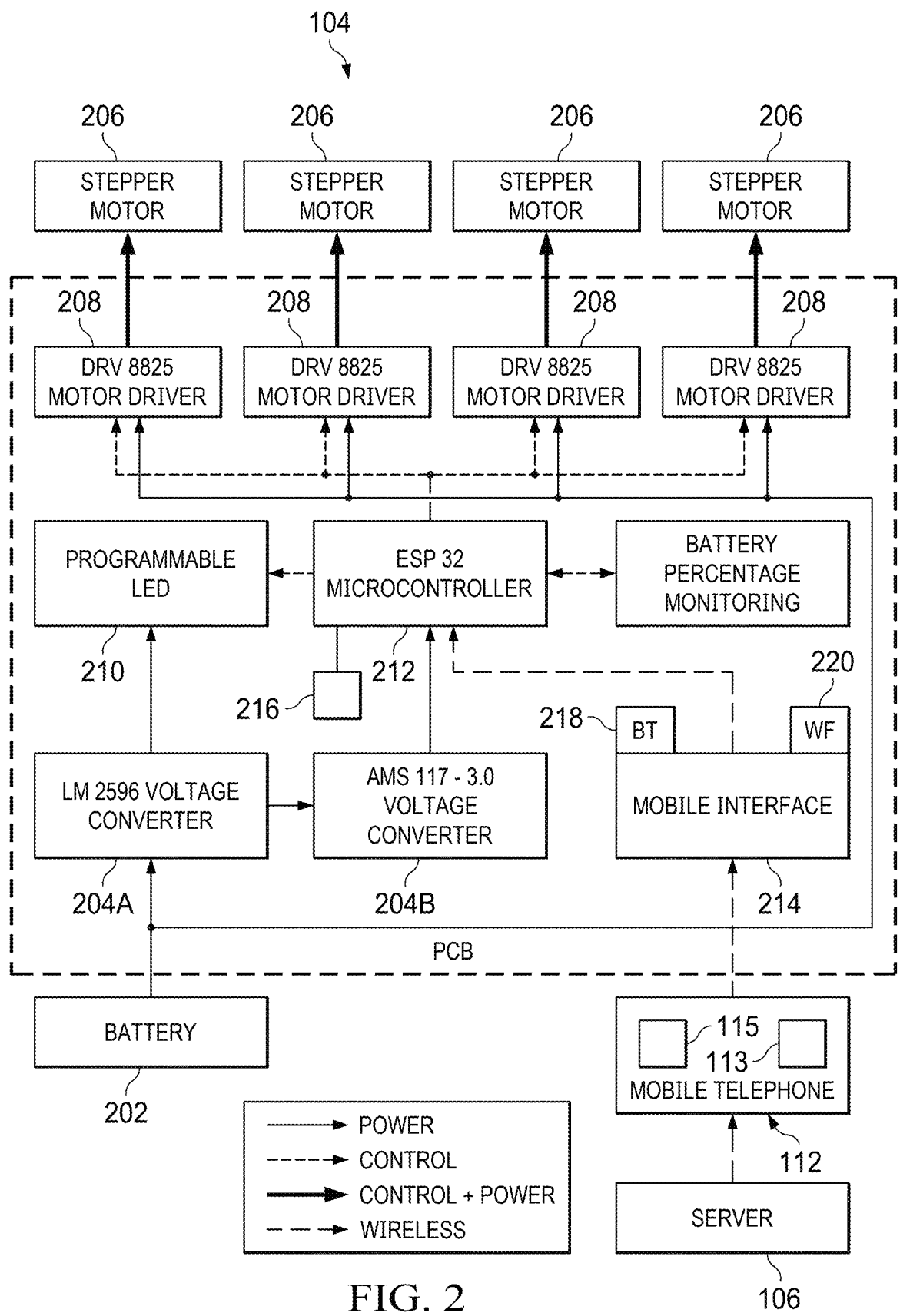
FIG. 2 illustrates a block diagram of the rover for scanning the undercarriage of a vehicle.

Referring now to FIG. 2, there is illustrated a block diagram of the rover 104. The illustration of FIG. 2 comprises the overall architecture of the hardware of the rover 104. The rover 104 is powered by a battery 202 that in one embodiment may comprise a lithium ion 4S battery providing 14.4 V with BM S (battery monitoring system). The voltages are converted to the necessary operating voltages and provided to all the system components of the rover using a voltage converter 204. The rover 104 draws power from the battery 202 or some other external power source. However, the components of the rover 104 require precise voltage regulation for the various components. The stepper motors 206, microcontroller 212 and LEDs 210 all operate at different voltage levels. The voltage converter 204A and 204B handles these conversions ensuring stability and efficiency of the rover 104. Battery voltage monitoring circuitry 203 can monitor the percentage of battery charge remaining.

Motor drivers 208 drive the stepper motors 206 by providing power and control signals to move the rover 104. The motor drivers 208 may in one embodiment comprise DRV 8825 motor drivers and provide control signals such as step count and speed to the stepper motors 206. The motor drivers 208 provide the signals to the stepper motors 206 with minimal electrical noise to enable accurate and smooth movement of the stepper motors.

The microcontroller 212 includes firmware that configures the microcontroller responsive to Bluetooth based commands from the mobile telephone 112. The mobile telephone 112 communicates with the microcontroller 212 via a mobile interface 214 that may include a Bluetooth module 218. The microcontroller 212 is further configured to provide stepper motor 206 control via the motor drivers 208, on board data storage, Wi-Fi/OTA capabilities and real-time communication with the backend server 106 providing the rover management system 102. Upon startup of the rover 104, the microcontroller 212 attempts to connect to Wi-Fi and either registers with the rover management system 102 or sends periodic heartbeat pings to the rover management system if the rover is previously registered with the system using credentials stored in the nonvolatile memory 216 of the microcontroller. The credentials may include information such as rover name, run counts and a randomly generated authentication key. The microcontroller 212 is also configured to listen for Bluetooth commands received from the app 113 on the mobile telephone 112 instructing movement of the rover 104, toggle the programmable LEDs 210 in a multicolor sequence prior to forward motion of the rover and then to precisely drive the four motor drivers 208 forward at 1/32 microstepping or backward at 1/8 microstepping.

The microcontroller 212 is also configured to provide special calibration moves for fine-tuning of the rover 104 movement. The microcontroller 212 continuously monitors for new OTA firmware updates and can reboot or update the microcontroller 212 if instructed to do so by the remote server 106. A dedicated button can reset the Bluetooth connection while the onboard LED 210 visually indicates whether the rover is connected. While a number of control and processing functions are described as being provided by the app 113 located on the mobile telephone 112, these control functions can be provided by a tablet or any other controller device associated with the rover 104 including the microcontroller 212.

In an alternative embodiment, the rover 104 may include a wireless charging mechanism that automatically charges both the rover main battery 202 and the onboard mobile telephone 112 without requiring any battery removal. After traversing its path and returning to a dock, the rover 104 will seamlessly recharge its power supply in a hands-free fashion. This enhancement would dramatically minimize human intervention, boost operational efficiency and reduce maintenance overhead. By enabling the rover 104 to autonomously handle its power needs, the rover may provide continuous operation with minimal downtime, thus ensuring sustain high performance and reliability.

The rover 104 may include dedicated enable pins to conserve power and reduce interference. The microcontroller 212 can disable or activate stepper motors 206 as needed in order to enhance energy efficiency and reduce noise when idle responsive to being disabled by the enable pins.

The mobile interface 214 includes both a Bluetooth module 218 and a Wi-Fi module 220. The Bluetooth and Wi-Fi modules 218, 220 provide for communication with external devices such as a smart phone app 223 on the mobile telephone 112 or the server 106. The communications links from these modules enable the exchange of control signals and real-time data to and from the rover 104.

The firmware within the microcontroller 212 integrates various hardware components such as the stepper motors 206, LEDs 210 and a Bluetooth module 218 within the mobile interface 214 for remote control. The firmware establishes a connection with a smart phone app 223 on the mobile telephone 112 via Bluetooth to allow users to send commands to control the rover 104 movement and LED 210 behavior. The firmware also incorporates Wi-Fi connectivity for over-the-air (OTA) firmware updates and periodic communication with the central server 106 to send status updates and receive commands. The firmware manages precise motor control movement of the rover 104 using stepper motors 206 and motor drivers 208 enabling the rover to move in precise increments based upon commands received from a smart phone app 223 located on the mobile telephone 112. The firmware also handles LED 210 lighting for illumination and visual feedback that indicate the rover 104 status and operational mode. The rover 104 generates a unique authentication key upon its first bootup and registers with the server 106 to prevent unauthorized access. The firmware also includes nonvolatile memory 216 to retain settings and track the number of runs, ensuring consistent operation across power cycles.

The rover 104 uses four high torque stepper motors 206 that are each paired with a motor driver 208. The stepper motors 206 are specialized motors that moved in precise increments or "steps." The stepper motor 206 can be instructed to rotate a specific number of steps and the motor will rotate the specific number of steps. The motor drivers 208 can subdivide each motor step into fractions of a step such as 1/8 or 1/32. This results in smoother motion, finer positioning and less vibration during movement. When the rover 104 needs to move forward slowly and capture high resolution images under the vehicle, the stepper motors 206 may use 1/32 microstepping, which is exceptionally precise. If the rover 104 needs to back out faster, 1/8 microstepping may be used for speed or based upon other requirements. The motor drivers 208 include an enable pin. If the rover 104 is not moving, the software within the microcontroller 212 can disable the motor drivers 208 reducing power consumption through the enable pin.

An array of programmable LEDs 210 is individually addressable and can produce any color desired. This provides for illumination for videos by lighting up the area beneath the vehicle so that the fisheye camera within the mobile telephone 112 can capture illuminated images of the undercarriage. Additionally, different lighting patterns and colors from the LED 210 can provide status indications of the rover 104 such as startup, moving or finished scanning. This visual feedback is especially useful in noisy or busy workshop environments.

The rover 104 includes a mobile interface 214 equipped with Bluetooth module 218 and Wi-Fi module 220 that provide Bluetooth and Wi-Fi connectivity for seamless wireless communications through the mobile interface 214. The Bluetooth module 218 enables the rover 104 to pair with the mobile telephone 112 or a tablet. A custom app 223 located on the mobile telephone 112 sends commands to instruct the rover 104 exactly how many steps to move rather than providing merely generic commands such as move forward. The rover 104 may receive these commands in real-time enabling the rover 104 to adapt on-the-fly when scanning an area under a vehicle. A reset button and LED 210 are tied to the Bluetooth module 218. Holding the button for a certain period of time can reset the Bluetooth, and the LED 210 indicates various connection states.

In addition to the Bluetooth module 218, a Wi-Fi module 220 enables the rover 104 to connect with a Wi-Fi network. The Wi-Fi module 220 periodically send a "heartbeat" message to a remote server 106. This message includes details like a unique ID for the rover 104, uptime, firmware version and the internal temperature of the microcontroller 212. This helps track if the rover 104 is online and healthy. The rover 104 also generates a unique identification key that is stored within its nonvolatile memory 216. This key is used to register with the server 106 ensuring only authorized devices can access certain system resources. The rover 104 can update itself without physical intervention using over-the-air firmware updates. If the server 106 has a new firmware version, the server instructs the rover 104 to download and install the update. This is crucial for deploying updates or bug fixes to a fleet of rovers 104 scattered across different facilities without connecting a cable to each rover.

The nonvolatile memory 216 stores important data for the rover 104 in a type of memory that does not get erased when power is lost. Information that may be stored within the nonvolatile memory 216 includes an authentication key and a rover name. This enables the rover 104 to store and recall its unique identity so it does not have to generate a new one every time the rover boots up. The nonvolatile memory 216 can also store a running count such that every time the rover 104 completes a scan or run under a vehicle, the rover increments an internal counter. This count is permanently saved and may be determined even if the rover 104 is powered down and then switch back on. This is helpful for maintenance schedules or for logging how many inspections have been performed by the rover 104.

The rover 104 also has the ability to stop when an obstruction is detected using a TOF sensor 222 connected to microcontroller 212. Detection of an obstruction by the TOF sensor 222 will cause the microcontroller 212 to issue stop commands to the motor drivers 208 which will stop movement of the rover 104.

Figure 3:
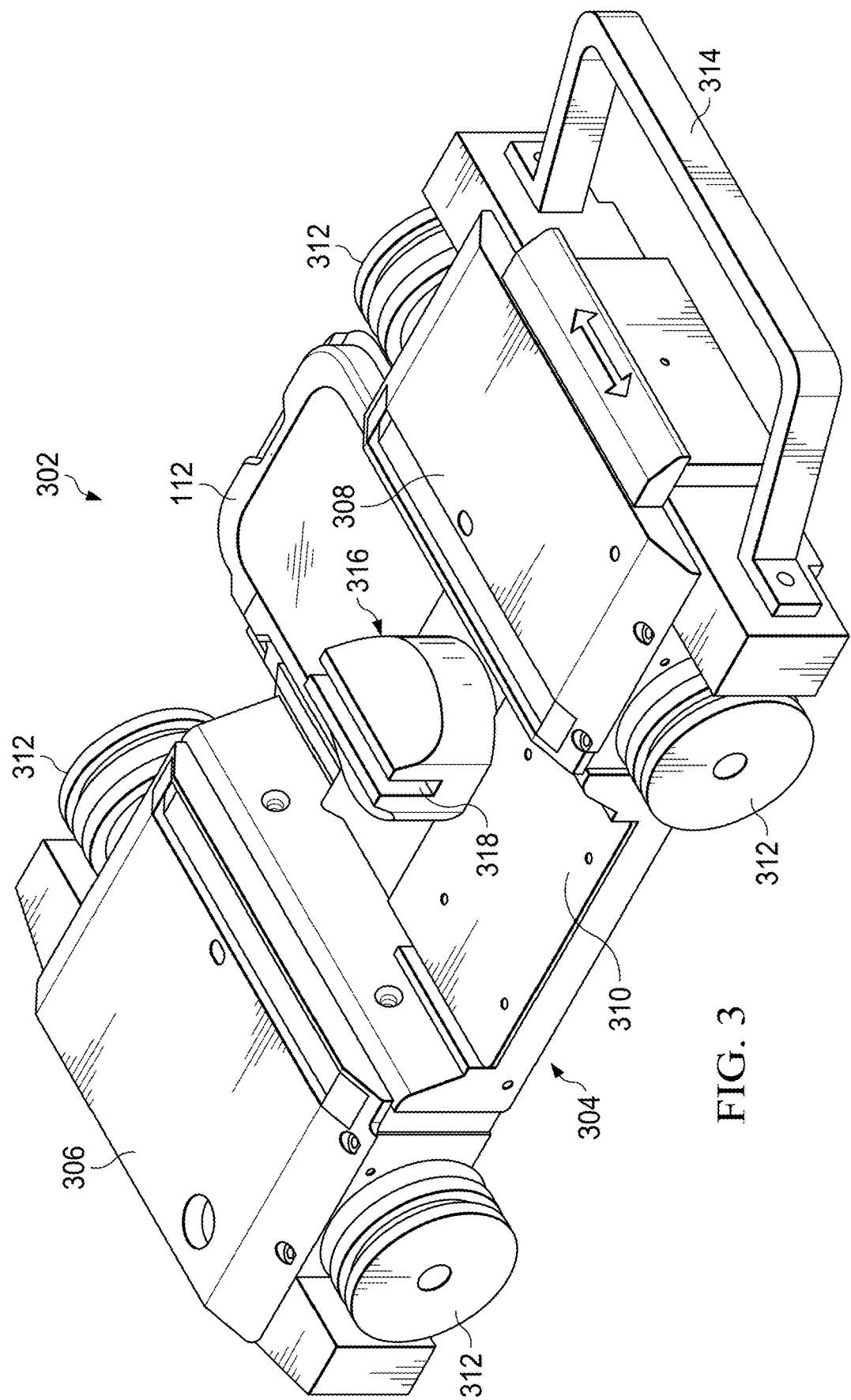
FIG. 3 illustrates a perspective view of the rover.
Figure 4:
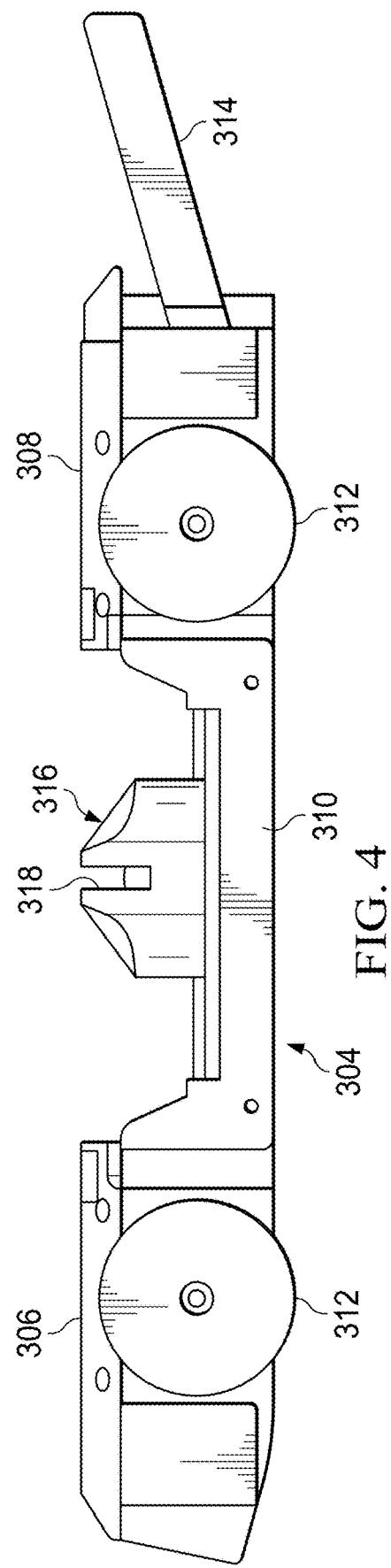
FIG. 4 illustrates a side view of the rover.

Referring now to FIGS. 3 and 4, there is illustrated a perspective view (FIG. 3) and a side view (FIG. 4) of the rover body 302. The rover body 302 defines a housing 304 consisting of a first portion 306, a second portion 308 and a mobile telephone cradle 310. The first portion 306 and the second portion 308 of the housing 304 define compartments for containing the various components of the rover 104. The first portion 306 contains the stepper motor 206 and motor drivers 208 to drive the front wheels 312 of the rover 104. The second portion 308 contains the stepper motor 206 and motor drivers 208 to drive the rear wheels 312 of the rover 104. The remaining components such as the microcontroller 212, voltage converter 204, mobile interface 214 and LEDs 210 may be located in various positions within either of the first portion 306 or second portion 308.

The mobile telephone cradle 310 defines an opening into which a mobile telephone 112 may be inserted between the first portion 306 and the second portion 308 of the housing 304. The mobile telephone 112 is positioned in such a fashion that a camera with a fisheye lens may take images of the undercarriage portion of a vehicle as the rover 104 passes thereunder. The mobile telephone cradle 310 is located between the first portion 306 and the second portion 308 of the housing 304 and allows the mobile telephone 112 to lay flat for taking video images of the undercarriage of the vehicle. A handle 314 enables movement of the entire rover body 302 by a person pushing or pulling on the handle.

A hood 316 is positioned above the fisheye lens of the mobile telephone 112. The hood 316 provides an opening through which the fisheye lens of the mobile telephone 112 may take video of the undercarriage of the vehicle. Surrounding the opening is a slot 318 that provides a hood to limit the field of vision of the fisheye lens to substantially the area of the center slice of the video frames that are taken for the video processing to create a stacked image of the vehicle undercarriage as will be more fully described herein below. Video is captured using the full field of view of the camera sensor. However, sunlight can cause glare along the edges of the images. The hood 316 for the lens blocks off excess sunlight but results in the hood itself being visible in the footage causing darkness, leading to overexposure. To address this issue, a region-based exposure can be implemented that concentrates only on the central portion of the sensor, thereby eliminating the overexposure problem.

The rover body 302 comprises a custom 3D printed component. The mobile telephone cradle 310 is configured to precision fit a mobile telephone case to ensure optimal strength, weight and functionality. The enclosures within the first portion 306 and the second portion 308 provide motor mounts and wire management features to optimize durability and efficiency. The mobile telephone 112 mounted within the mobile telephone cradle 310 includes a fisheye lens for taking the video images of the vehicle undercarriage. The wide-angle lens captures a full, distortion-corrected view of the vehicles undercarriage is the rover 104 moves underneath the vehicle. With a fisheye lens, the mobile telephone camera can gather a comprehensive image in one sweep under the vehicle.

Figure 5:
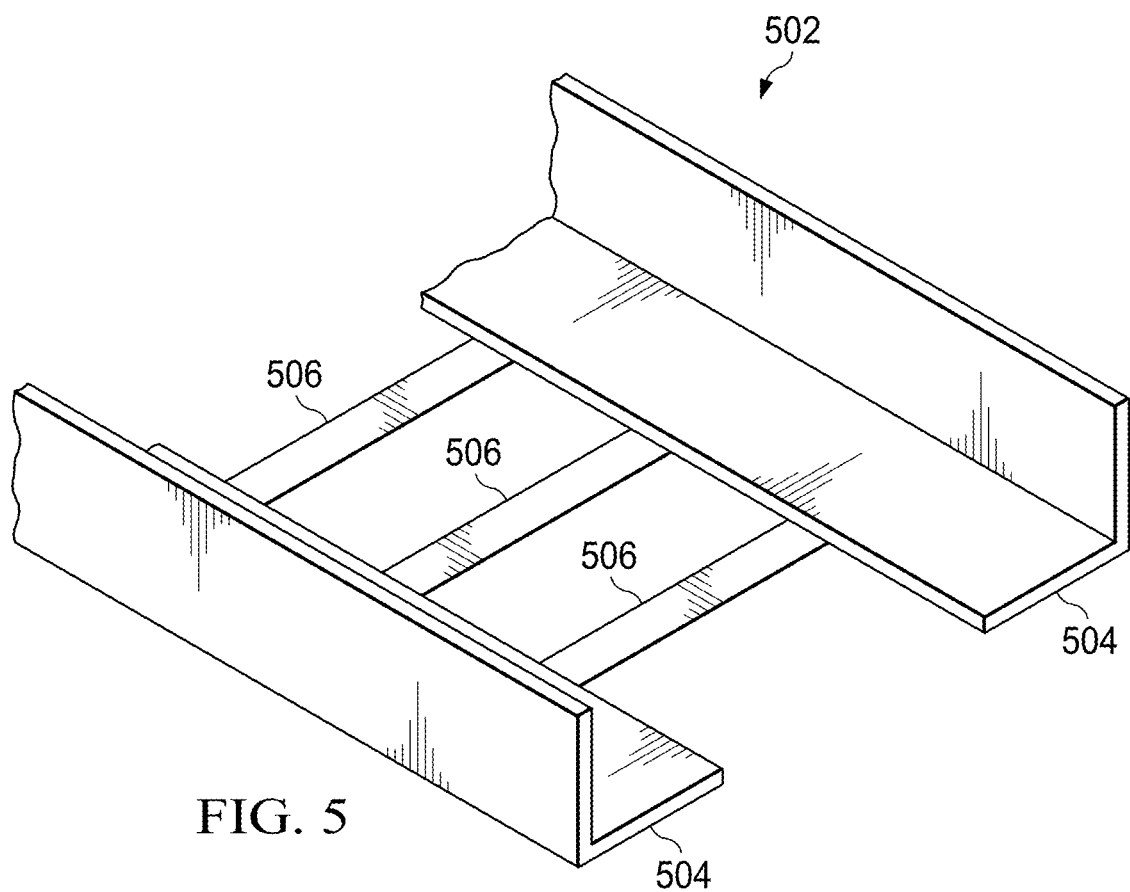
FIG. 5 illustrates a perspective view of the tracks for guiding a rover under a vehicle.

Referring now to FIG. 5, there is illustrated the tracks 502 for maintaining the rover 104 in a straight line when the rover is moving in a first direction to scan under a vehicle and in a second direction to return to the start position. The tracks 502 comprise in one embodiment, a pair of L-shaped brackets 504 on which the wheels of the rover 104 will travel when moving in the first and second directions. In one embodiment, the L-shaped brackets 504 may comprise stainless steel angle iron but various other types of materials may be utilized as long as they will support the wheels 312 of the rover 104. The L-shaped brackets 504 are welded together with slats 506 between the L-shaped brackets. Alternatively, the L-shaped brackets 504 may be welded to a plate (not shown) having a predetermined size based upon the site and use case of the rover 104. The tracks 502 are laid down on concrete, rocks, dirt, etc. to provide a smooth path for the rover 104 to move while scanning a vehicle undercarriage. The L-shaped brackets 504 can be welded to the plates or slats 506 so that the flat edge is facing up providing a rail for the rover. It can also be installed with the 900 angle face up, with a flat edge welded to a plate or slats on both sides for rigidity as illustrated in FIG. 5.

Figure 6:
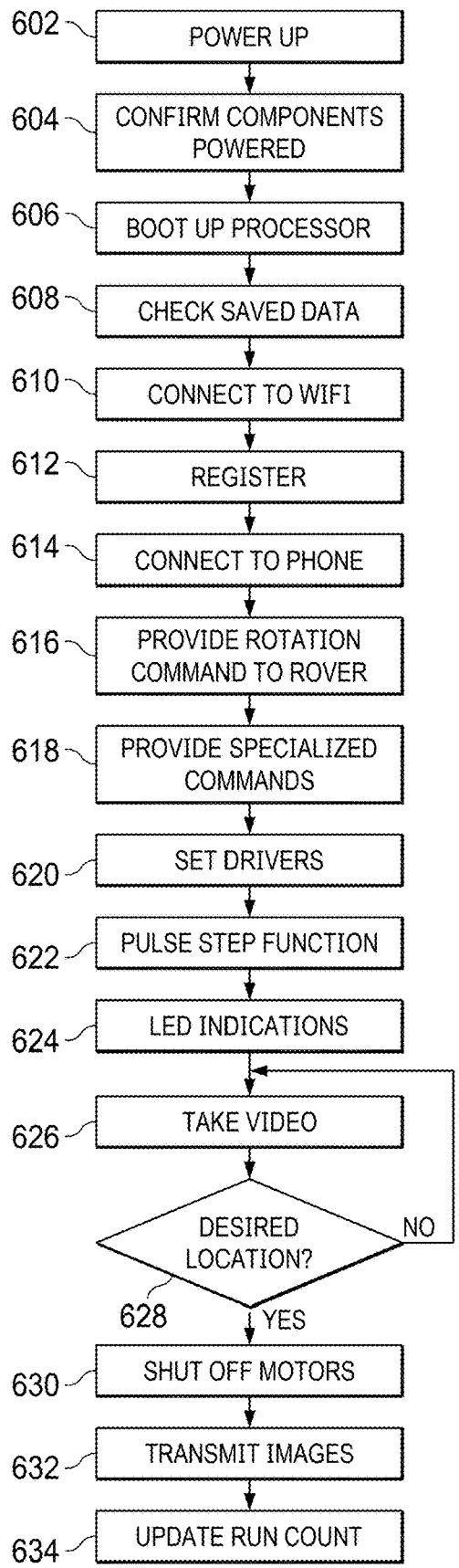
FIG. 6 illustrates a flow diagram of the overall process for controlling a rover to capture images of the undercarriage of the vehicle.

Referring now to FIG. 6, there is illustrated a flow diagram of the flow of operation of the rover 104 and rover management system 102. Operation of the rover 104 is initiated by turning the power on for the rover to initiate a power-up process at step 602. The rover 104 confirms at step 604 that all of the components within the rover are powered up. The microcontroller 212 is booted up at step 606. During boot-up, the microcontroller 212 checks saved data at step 608 within the nonvolatile memory 216 to confirm information such as rover name, authentication key and run count. The rover 104 then attempts to connect to Wi-Fi at step 610. If the rover successfully connects to Wi-Fi at step 610, the rover 104 contacts the rover management system 102 within the server 106 via the Wi-Fi connection to register the rover with the rover management system 102 at step 612 and announced that it is active and ready to operate. The startup process also determines if the Bluetooth module 218 is active and if so, pairs with a mobile telephone 112 at step 614 associated with the rover. While the use of a mobile telephone 112 has been described, it will be appreciated that any Bluetooth capable device or other processing device may be used.

Using Bluetooth, the mobile telephone 112 may provide commands at step 616 to the rover 104 specifying how many rotations (or parts of rotations) the wheels 312 of the rover should make to move the rover 104 over a predetermined distance. This enables the rover 104 to move an exact number of step counts. The rover 104 may also receive specialized commands at step 618 for lighting up LEDs 210, calibrating positions or returning to a home location to begin a further scan. The rotation commands received at step 616 are used to set the drivers 208 at step 620 to a required micro-stepping mode to move the rover 104. The drivers 208 provide a pulse step function at step 622 to pulse the step signals in a desired time sequence. Each pulse corresponds to a fraction of a rotation. This enables the motor drivers 208 to provide precise movement of the rover 104.

A s the rover 104 moves, the LEDs 210 may provide at step 624 flashing sequences of red to yellow to green responsive to the provided L E D commands at step 618 to signal stages like preparing, moving or done for the rover 104. This enables a determination of the status of the rover 104 at a glance. A s the rover 104 is moving, the video is taken at step 626 by the mobile telephone 112. Alternatively, an independent video camera could be used. Inquiry step 628 determines if the rover 104 has reached a desired position. If not, the rover 104 continues to take the video at step 626. Once inquiry step 628 determines that the rover has reached a desired location, the stepper motors 206 are shutdown at step 630. The generated video images may then be transmitted at step 632, if necessary. The rover 104 may also update its run count within the nonvolatile memory 216 at step 634.

Figure 7:
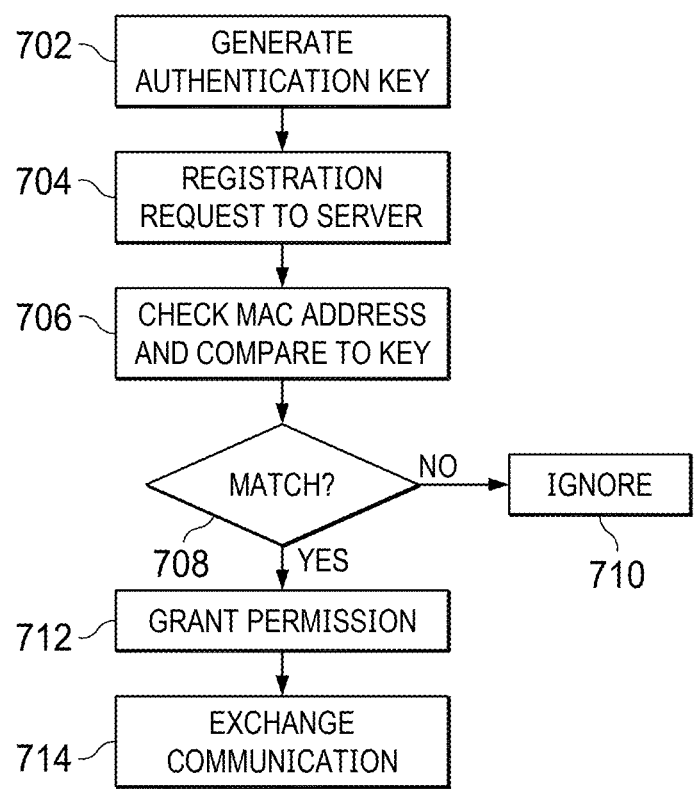
FIG. 7 illustrates a flow diagram of the process for authenticating a rover with the rover management system.

Referring now to FIG. 7, there is illustrated a flow diagram of the authentication process occurring during registration of the rover 104 at step 612 of FIG. 6. During a first start of the rover 104, the firmware within the microcontroller 212 generates at step 702 an authentication key. The rover 104 then sends at step 704 a registration request to the rover management system 102 within the server 106. Upon receipt of the registration request, the rover management system 102 will check the rover's MAC address and compare the M A C address with the presented authentication key at step 706. Inquiry step 708 determines if the M A C address and authentication key match. If they do not match, control passes to step 710 and the request is ignored preventing unauthorized rovers 104 from masquerading as genuine rovers. If inquiry step 708 determines that the MAC address and authentication key do match, the rover is officially recognized and granted permission at step 712 to communicate further with the rover management system 102.

Once the rover 104 is granted access permission at step 712, the rover 104 may exchange further communications at step 714 with the rover management system 102 within the server 106. These communications may include periodically uploading important status information such as CPU temperature, IP address, how many times a scan has been run, rover uptime and even total miles traveled by the rover if any of this data is being tracked. This two-way communication between the rover 104 and the server 106 allows the server to command a remote reboot of the rover, trigger a firmware update or pull real-time telemetry from the rover. Periodically the rover 104 will ping the server 106. If a new firmware update is available for the microcontroller 212, the microcontroller 212 automatically upgrades itself over the Wi-Fi connection. If the server 106 request a reboot, the microcontroller 212 will reboot. If the server 106 wants the rover 104 to rename itself the rover 104 may be given instructions to do so all without manual intervention from a user.

Figure 8:
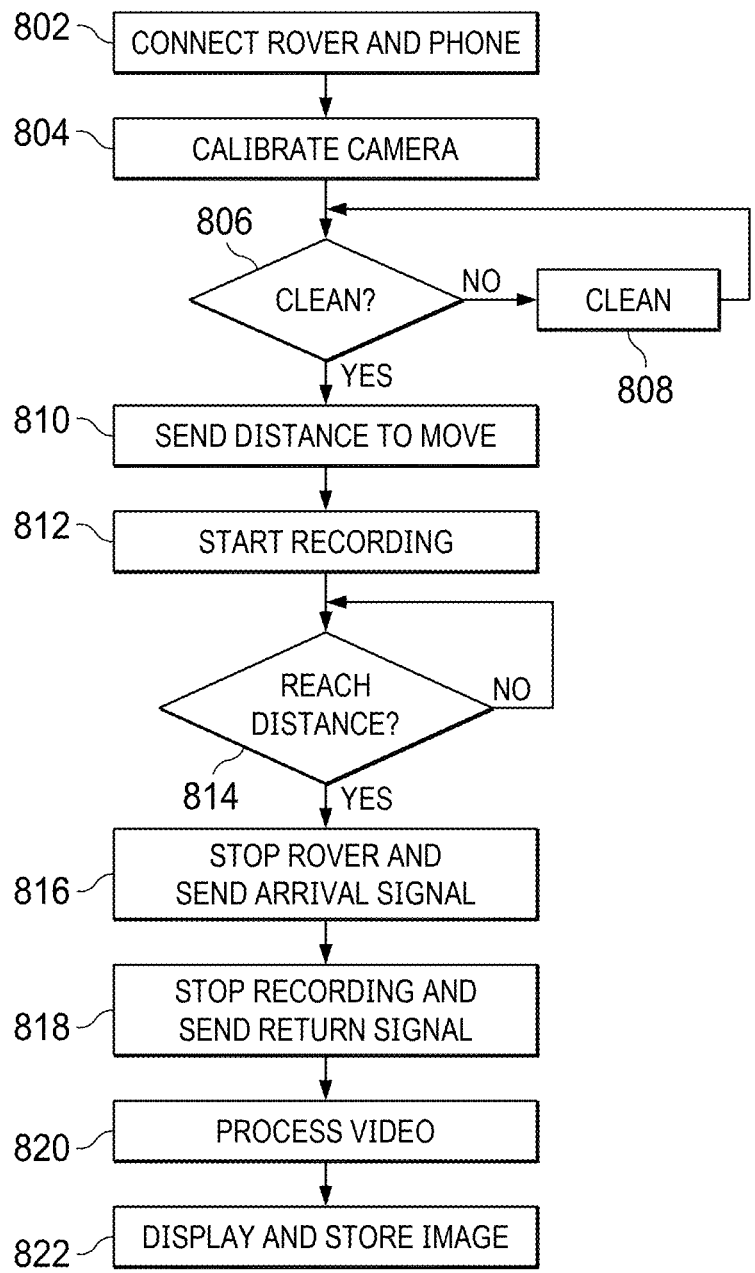
FIG. 8 illustrates a flow diagram of the process for capturing images of the undercarriage of a vehicle using the rover.

Referring now to FIG. 8, there is illustrated a flow diagram of the process for utilizing the camera within a mobile telephone 112 for generating images of the undercarriage of a vehicle from video. Initially, the rover 104 and mobile telephone 112 are connected at step 802 using Bluetooth via an app 113 located on the mobile telephone 112. The camera 115 within the mobile telephone 112 is calibrated at step 804. The rover 104 and the app 113 within the mobile telephone 112 communicate with each other to move and click pictures in order to carry out the calibration process as will be more fully discussed herein below with respect to FIG. 11. Inquiry step 806 determines if the lens of the camera is clean. If not, control passes to step 808 to enable cleaning of the camera lens. Once the lens of the camera 115 is determined to be clean at step 806, the rover 104 is ready to receive the instructions for the distance to move for a particular undercarriage scan. The app 113 sends at step 810 the rover 104 an instruction to move forward a specific distance and record video. The rover starts recording video at step 812 as it begins to move forward the indicated distance. Inquiry step 814 determines if the rover 104 has reached the indicated distance and if not continues to monitor at inquiry step 814. Once inquiry step 814 determines that the rover 104 has moved the requested distance, the rover stops and sends an arrival signal at step 816 to the app 113 indicating the rover 104 has moved the requested distance.

Responsive to the arrival signal, the app 113 ceases recording of the video of the vehicle undercarriage and sends a return signal to the rover 104 at step 818. The return signal instructs the rover 104 to return to its initial location. During the return of the rover 104 to the initial location, the app 113 begins processing at step 820 of the video to generate the stacked image of the undercarriage from the video data. The stacked image will comprise a neatly stitched image as more fully described herein below with respect to FIGS. 12 and 13. After completion of the video processing, the stacked image is displayed on the app 113 and stored locally within the mobile telephone 112 at step 822. The generated stacked image can be uploaded at step 824 to the rover management system 102 within the server 106. The rover 104 is then ready to perform a next undercarriage scan and generate a further stacked image.

Figure 9:
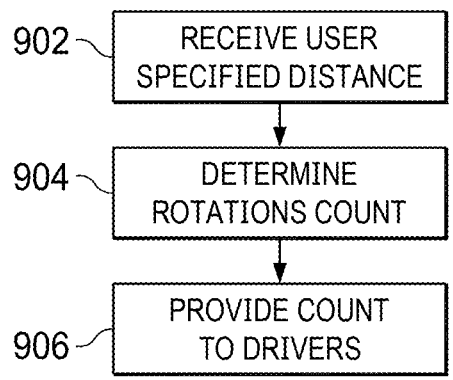
FIG. 9 illustrates a flow diagram of the process for controlling distance of movement of the rover.

Referring now to FIG. 9, there is illustrated a flow diagram of the process for generating the dynamic distance to rotation calculation to enable precise movement of the rover 104 along the track 502. By providing the specified distance to travel, scan time is saved when scanning shorter length vehicles and also ensures that a portion of the undercarriage is not missed when scanning longer length vehicles. Microcontroller 212 initially receives at step 902 a user-specified distance from the app 113 that the rover 104 is required to move to scan the undercarriage of a vehicle. The microcontroller 212 determines at step 904 a rotation count for the wheels 312 of the rover 104 in order to achieve the received specified distance. The rover's 104 ability to travel a user-specified distance is impacted by challenges such as wheel slippage and track 502 variations. These lead to discrepancies between the intended and actually travel distances. In order to overcome these challenges, a rotations count with respect to a specified distance is determined according to the equation:

$$rotationsCount = \frac{(distaceInFeet * distaceAdjustmentFactor * feetToInchFactor * mmToInchFactor)}{(k * \pi * wheelDiameterInMM)}$$

Factors:
  slip factor, k=0.987
  distaceAdjustmentFactor=1.006
Constants:
  Pi=3.14159
  feetToInchFactor=12
  mmToInchFactor=25.4
Variables:
  distaceInFeet, wheelDiameterInMM The determined rotations count is provided from the microcontroller 212 to the motor drivers 208. The above formula achieves 99.65% accuracy thus enabling the rover 104 to travel within 0.35% of its intended distance. The formula may be easily adapted to different rover wheel sizes, track links and terrains. It provides a high degree of accuracy despite wheel slip or drag.

Figure 10:
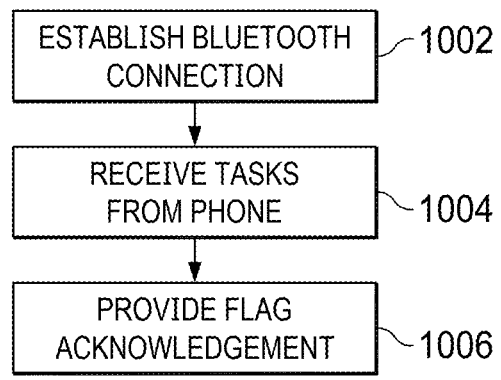
FIG. 10 illustrates a flow diagram of the process for communicating between the rover and an associated mobile telephone.

Referring now to FIG. 10, there is illustrated of the flow process for establishing a Bluetooth connection between the rover 104 and the app 113 within the mobile telephone 112. The rover 104 establishes communication at step 1002 with the mobile telephone 112 using Bluetooth socket connection communications. The rover 104 may then receive tasks at step 1004 from the app 113 on the mobile phone 112. Responsive to these tasks, the rover 104 will respond with a flag acknowledgment at step 1006 for each task received from the app 113. Once the app 113 is notified of completion of the task by the rover 104, the app will proceed to next steps. This constant communication between the rover 104 and the app 113 on the mobile telephone 112 enables the rover 104 to reach specified distances and update a flag which makes the telephone mobile telephone 112 cease recording.

Figure 11:
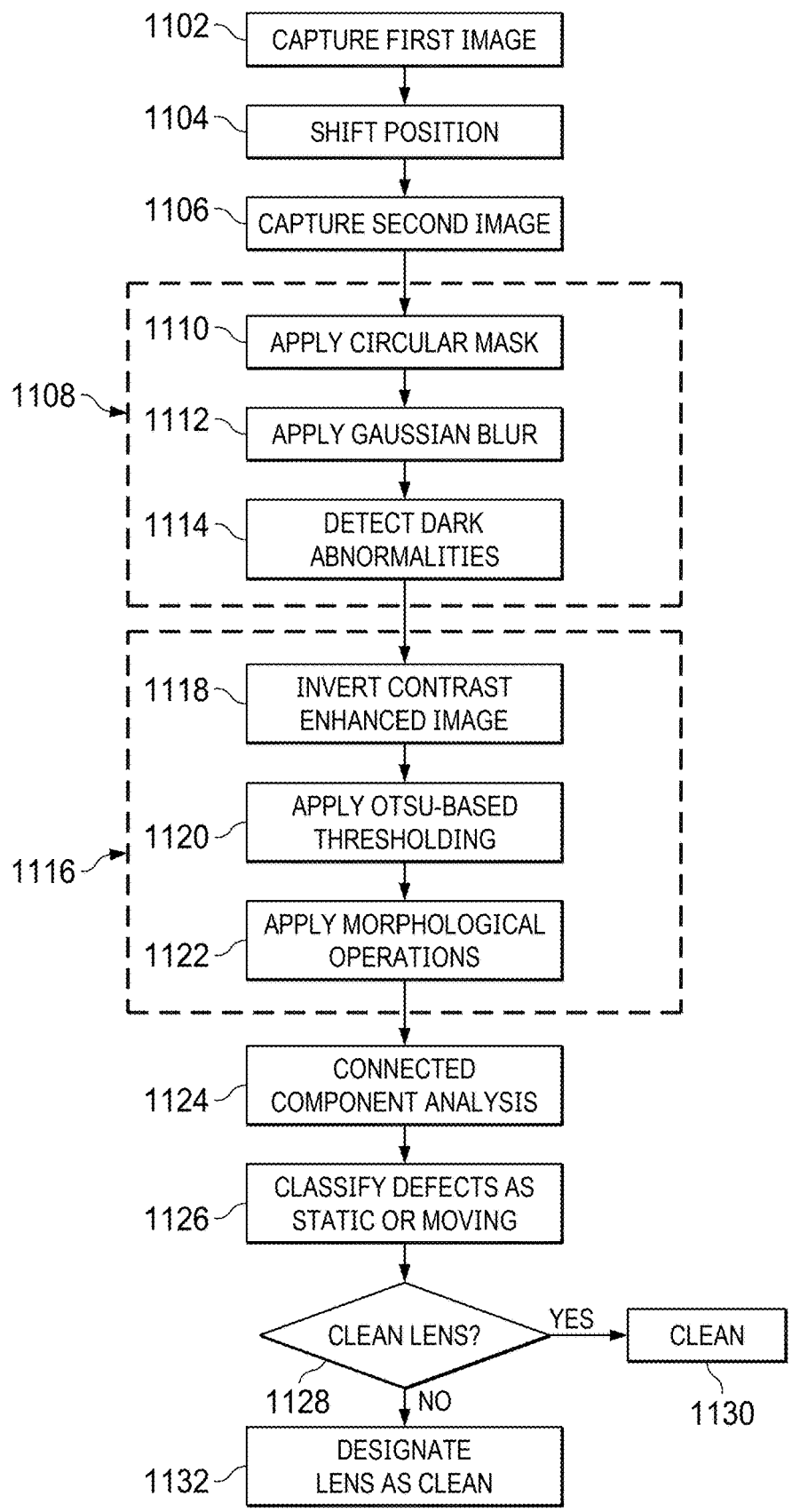
FIG. 11 illustrates a flow diagram of the process of calibrating the camera to check if the lens is clean.

Referring now to FIG. 11, there is illustrated a flow diagram of the process for calibrating a camera 115 within a mobile telephone 112. The camera calibration is done to detect dust on the lens of the camera 115 and to confirm whether the dust is on the lens or in the background of an image. This is done by taking two pictures and comparing them to confirm the SMA EE. If it is confirmed that the dust is on the lens, cleaning is required. If the dust is in the background, the dust can be ignored and the rover 104 proceeds with the next steps. The process uses purely algorithmic operations (thresholding, morphological filters, connected component analysis) rather than machine learning modules for camera calibration.

The camera 115 captures a first image at step 1102 and shifts position of the rover 104 to a new position at step 1104. At the new position, the camera 115 will capture a second image 1106. The camera 115 next performs an adaptive thresholding operation at step 1108 that includes steps 1110, 1112 and 1114. A circular mask is applied at step 1110 to the compared images and a Gaussian blur is applied at step 1112 to filter out extraneous regions from the compared images. The circular mask comprises a circular region of interest that ensures the analysis focuses on the lens area and excludes peripheral image regions. Adaptive thresholding may then be applied to detect dark abnormalities (e.g. dust spots, scratches) with respect to the camera.

OTSU-based thresholding is used at step 1116 to detect light abnormalities (e.g., faint smudges, light scratches) on the lens. This process involves inverting at step 1118 a contrast-enhanced image and then applying OTSU-based thresholding at step 1120 followed by morphological operations at step 1122. Clusters of pixels representing potential contaminants are identified and measured for size, location and pixel count using connected component analysis at step 1124. The defects are classified as static or moving at step 1126 by comparing the coordinates of detected defects using a Euclidean distance in both the first and second images to allow for classification of defects as static (on the lens) or moving (background changes). Inquiry step 1128 determines whether the lens requires cleaning based upon these analysis and if so, clean the lens at step 1130. If no lens cleaning is determined as necessary, the lens is designated as clean at step 1132.

Figure 12:
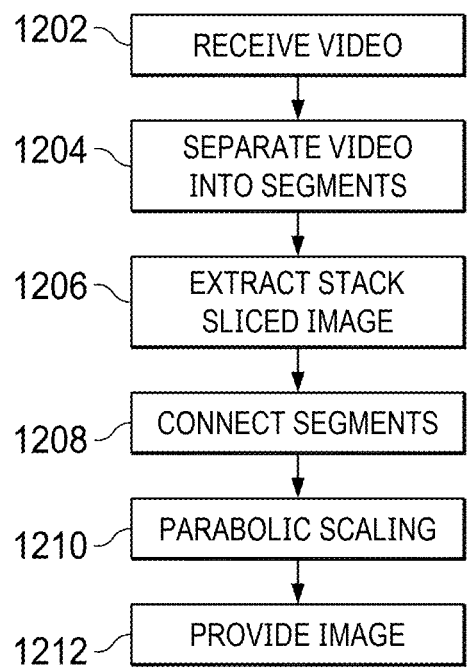
FIG. 12 illustrates a flow diagram of the slicing process for creating the stacked image of the undercarriage of the vehicle.

Referring now to FIG. 12, there is illustrated a top-level block diagram of the procedure for processing a video of the undercarriage taken by the rover 104 in order to create a single undercarriage stacked image. The video processing is carried out by the app 113 included within the mobile telephone 112. The app 113 receives at step 1202 the video from the camera 115 of the mobile telephone 112. The video is first separated into three separate segments that will be processed simultaneously. The three separate segments will overlap at their edges such that overlapping portions of the video will be included at the edges in two adjacent segments. Each of the three segments of the video are processed in parallel to extract at step 1204 a slice from the center of each frame contained within each of the three separate segments and stack the slices into a stacked image at step 1206. The stacked image has parabolic scaling applied thereto at step 1210 and the completed stacked image is provided at step 1212.

Figure 13:
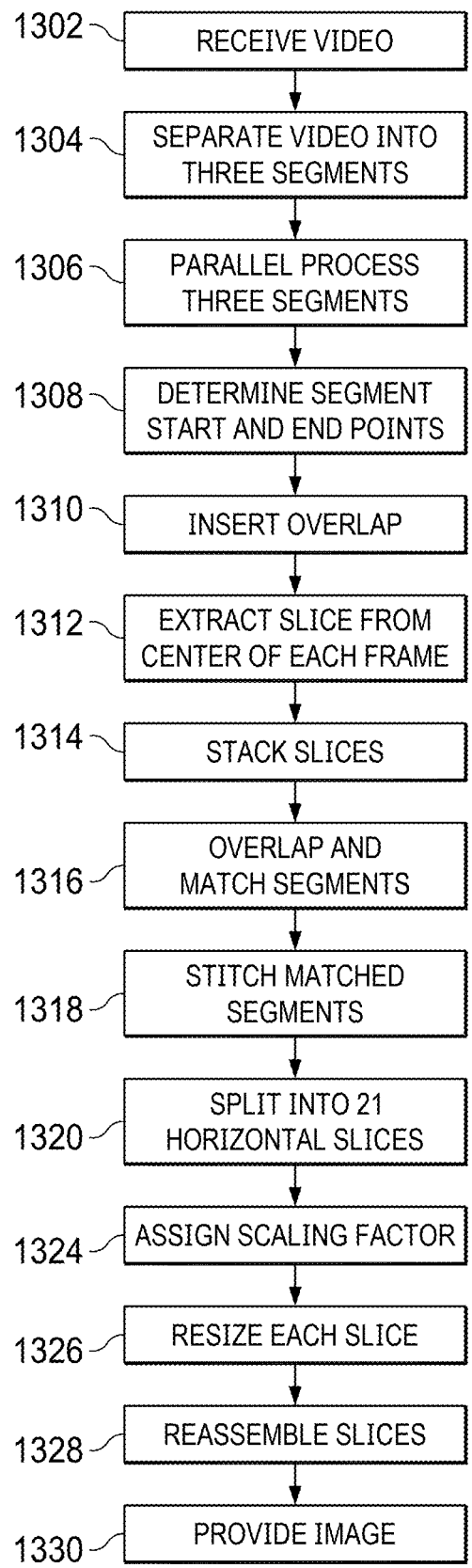
FIG. 13 illustrates a more detailed flow diagram of the slicing process of FIG. 12.
Figure 14:
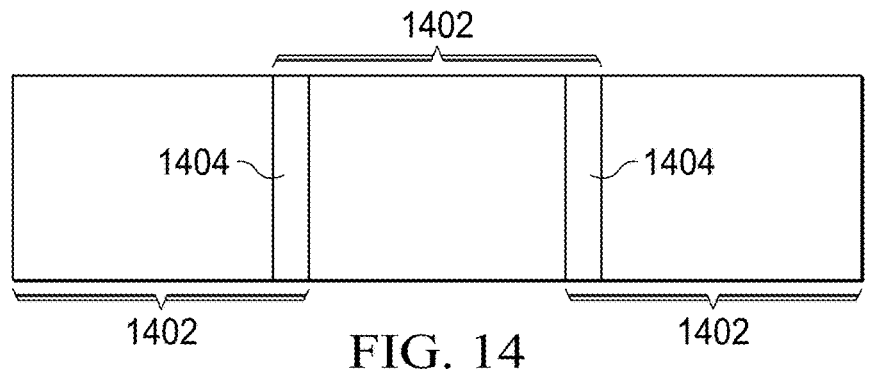
FIG. 14 illustrates the segmenting of a video into multiple segments for processing to create a stacked image of the undercarriage of the vehicle.

Referring now to FIG. 13, there is illustrated a more detailed flow diagram of the processing of the video taken by the mobile telephone 112 in order to create a single stacked image of the undercarriage of the vehicle. As discussed previously, the mobile telephone camera 115 takes a video of the undercarriage when the rover 104 is moving. The mobile telephone 112 records the video with the lens at maximum zoom out. This video is received at step 1302 by the app 113 which separates the video at step 1304 into three separate segments 1402 with overlapping edges as shown in FIG. 14. While the following discussion envisions the separation of the video into three separate segments, the video may be separated into a different number of segments and still implement the process described herein in real time without manual intervention. Each of the three separate segments are then processed in parallel at step 1306 in order to create the image slices from each frame and the stacked image as described herein below. With respect to each segment, the starting point and ending point of the segments are determined at step 1308. This is achieved using total frame count and frame per second data to provide accurate division of the segments. Overlapping frames (e.g. 60 frames) are inserted at step 1310 between each of the segments to ensure that no video footage is lost at the split points where the segments are separated. Thus, as further shown in FIG. 14, each of the segments 1402 includes an overlapping region 1404 that is included in each of the adjacent segments.

Figure 15:
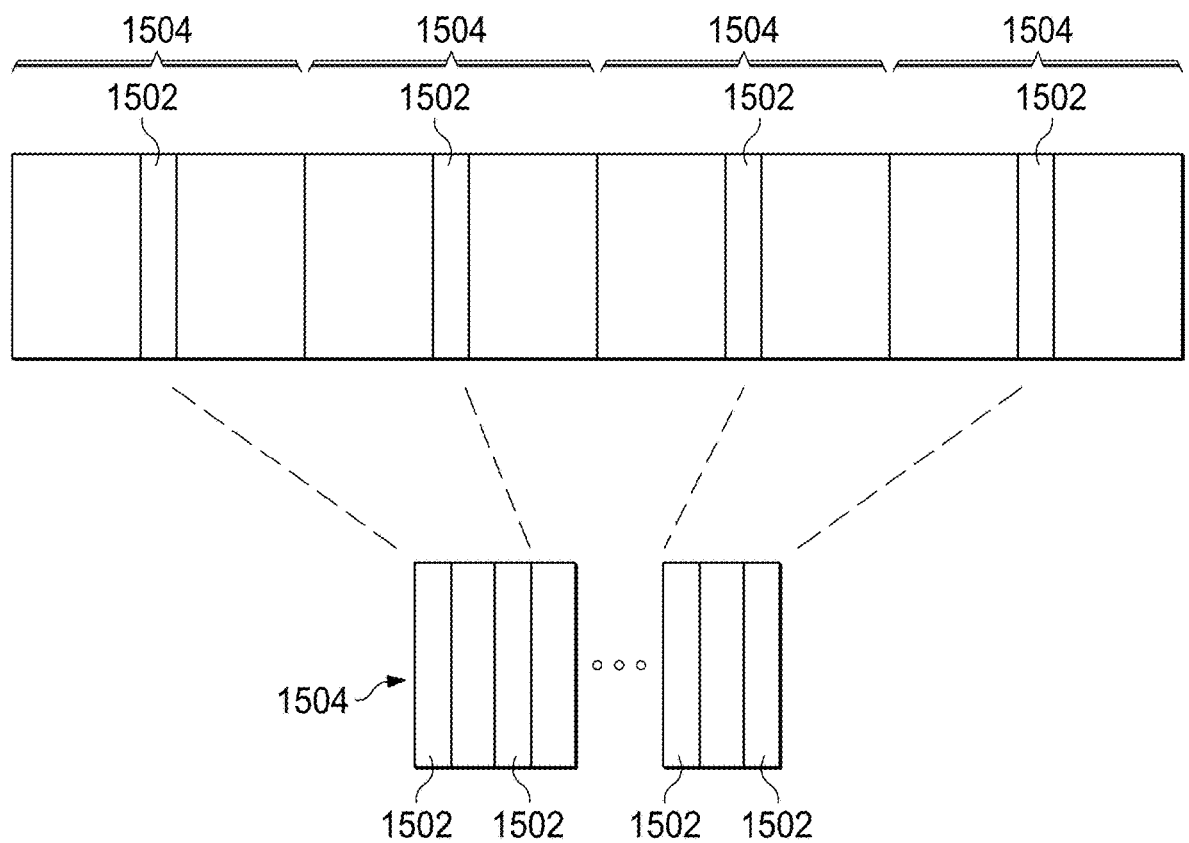
FIG. 15 illustrates the extraction of slices from video frames to create a stacked image.
Figure 16:
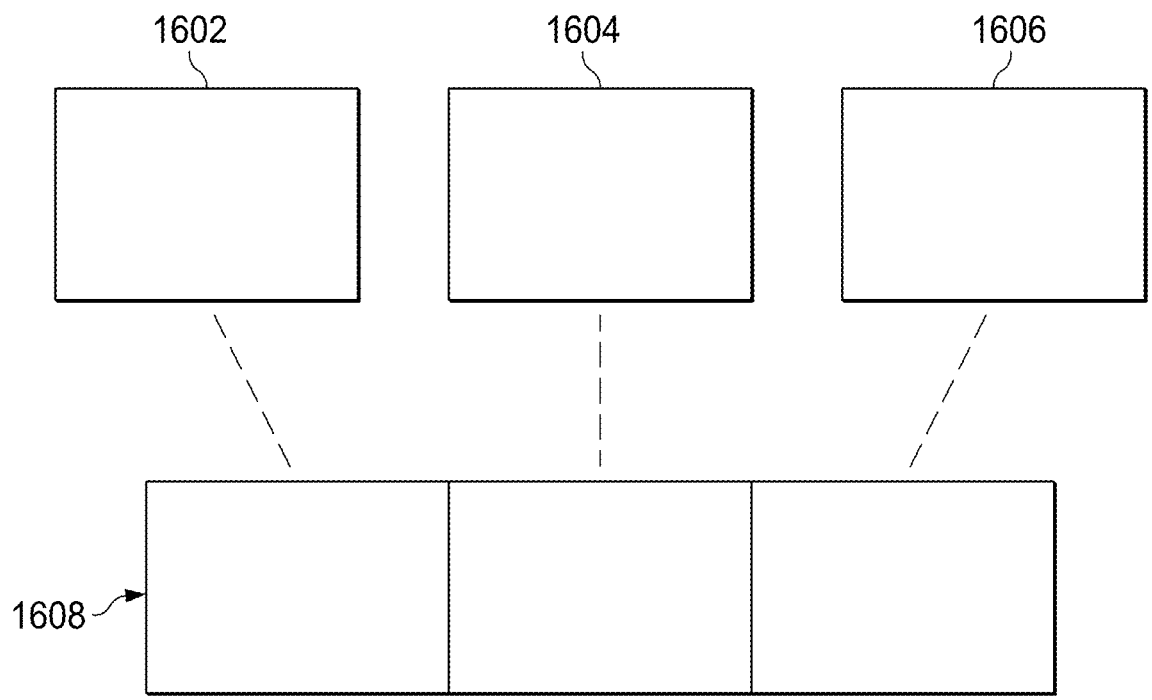
FIG. 16 illustrates structure of a completed stacked image created from a video.

For each frame of video within each of the segments 1402 being processed in parallel, a single vertical slice 1502 is extracted at step 1312 from the center of each frame as more particularly shown in FIG. 15. These extracted slices 1502 are concatenated (stacked) at step 1314 into a single strip-like stacked image 1504 for each of the three video segments being processed in parallel. The overlapped regions 1404 at the end of each segment 1402 comprise a N pixel wide overlap region (where N is in the range of 60-120) at the end of each segment and the beginning of the next segment 1402 in order to avoid loss of frames during runtime video slicing. In order to overlap each of the three segments 1402 in a continuous fashion that does not cause the loss of any of the undercarriage image, the overlapped regions 1404 are matched at step 1316 by calculating similarity between the overlapping regions in adjacent segments 1402 to determine the optimal alignment and stitching between the segments. For example, mean squared error or other distance metric may be used to calculate the similarity. A specialized matching algorithm based on pixel-wise error may be utilized to pinpoint the best possible alignment between overlapping regions 1404. As shown in FIG. 16, once the similarity has been determined the first strip image 1602 and second strip image 1604 of the first and second segments 1402 may be stitched together at step 1318 where their respective five pixel segments provide the best overlap match. The matching and stitching process is repeated to attach the third strip image 1606 to the previously connected first and second strip images using the same five pixel overlap strategy to provide the completed stacked image 1608.

The completed stacked image 1608 comprises a final, wide-format, continuous panoramic image formed by seamlessly joining three strip images 1602, 1604 and 1606 together into a single completed stacked image 1608. The matching may overlap the overlapping slices to mitigate visual discontinuities and ensure alignment accuracy. Computer vision and encoding such as open CV for frame extraction, image slicing and encoding/decoding may be used to optimize image storage and manipulation.

Once the completed stacked image 1608 has been created, there can be issues with the image exhibiting stretching at the top and bottom edges of the completed stacked image 1608 due to the fisheye effect. In order to overcome this additional processing is necessary. The completed stacked image 1608 is split at step 1320 into 21 horizontal slices that offer enough granularity to correct localized distortion without excessive computation. Each of the horizontal slices are assigned a scaling factor at step 1324 forming a parabolic curve with the smallest changes occurring near the center of the image and the larger changes occurring toward the horizontal edges of the image 1608. The middle horizontal slice will have a scale factor of 1.0 to ensure that the center of the image remains unchanged. Scaling factors can be normalized to maintain a desired overall ratio and will increase in magnitude as the factors move from the center toward the horizontal edges. Each of the horizontal slices are resized at step 1326 according to the assigned scaling factor. These resized slices are reassembled at step 1328 in order to provide at step 1330 the finally processed image.

The use of the horizontal slice parabolic scaling provides for gradual scaling changes between horizontal slices that minimizes visible seams or banding. The focal midpoint of the image remains substantially untouched thus reducing unnatural distortion in key areas. The parabolic curve used for generating the scaling factors can be adapted to different resolutions, different patterns or different aspect ratios.

The stitching and postprocessing steps of the video are normally completed within 30 seconds. This is approximately the time it takes for the rover 104 to return to its starting point. The user can then review the generated image and upload the final image as appropriate.

In a further embodiment, a custom CNN (convolutional neural network) can be trained to detect a vehicle's front and rear bumpers and stop scanning of the undercarriage responsive to detection of the bumper. A CNN is a specialized type of neural network used for analyzing and understanding visual data. This allows the rover 1042 adjusted travel distance according to the cars actual link, removing the need to traverse the entire tract unnecessarily. A CNN model may be trained to isolate the undercarriage by cropping the relevant region and removing any background.

It will be appreciated by those skilled in the art having the benefit of this disclosure that this undercarriage imaging rover provides an improved matter for documenting and imaging the undercarriage of a vehicle to, for example, document damage for cost analysis or insurance purposes. It should be understood that the drawings and detailed description herein are to be regarded in an illustrative rather than a restrictive manner and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus for scanning an undercarriage of a vehicle, comprising:
   a rover for moving back and forth under the vehicle;
   at least one processor for generating control signals to control movement of the rover and to control capture of a video of the undercarriage of the vehicle;

a drive system responsive to the control signals from the processor for moving the rover back and forth under the vehicle;

a camera for capturing the video of the undercarriage of the vehicle as the rover moves under the vehicle in a first direction;

wherein the at least one processor is further configured to:
   receive the video from the camera of the undercarriage of the vehicle;
   separate the video from the camera into a plurality of segments, each of the segments including at least one portion that overlaps with an adjacent segment of the plurality of segments;
   process each of the plurality of segments in parallel to generate a stacked image of each of the plurality of segments, the stacked image comprising a single image slice from each frame of a segment stacked together into the stacked image;
   connect each of the stacked images together to generate a single stacked image of the undercarriage of the vehicle; and
   divide the single stacked image into a plurality of horizontal segments;
   apply parabolic scaling factors to each of the plurality of horizontal segments of the single stacked image to generate a single image of the undercarriage of the vehicle.

2. The apparatus of claim 1, wherein the at least one processor is further configured to:
   receive an input to move the rover a predetermined distance under the vehicle;
   determine a number of steps associated with the predetermined distance; and
   generate a control signal to command the drive system to move the rover the determined number of steps.

3. The apparatus of claim 1, wherein the drive system further comprises:
   a plurality of stepper motors, each of the stepper motors associated with a wheel of the rover; and
   a plurality of motor drivers, each of the motor drivers associated with one of the plurality of stepper motors and configured to drive the stepper motors responsive to the control signals from the at least one processor.

4. The apparatus of claim 1, wherein the at least one processor is further configured to:
   receive a first image and a second image from the camera;
   determine static abnormalities and moving abnormalities associated with a lens of the camera responsive to processing of the first image and the second image; and
   provide an indication of whether the lens is clean or dirty responsive to the determined static abnormalities and moving abnormalities.

5. The apparatus of claim 1, wherein to process each of the plurality of segments the at least one processor is further configured to:
   extract a slice from substantially a center of the each frame in a segment; and
   stack each of the slices from the segment into the stacked image for the segment, wherein each of the plurality of segments has a separate stacked image associated therewith.

6. The apparatus of claim 1, wherein to perform parabolic scaling the at least one processor is further configured to:
   divide the single stacked image into a plurality of horizontal slices;
   assign a scaling factor to each of the plurality of horizontal slices;
   resize each of the plurality of horizontal slices according to the assigned scaling factor; and
   reassemble the resized plurality of horizontal slices into a resized single stacked image.

7. The apparatus of claim 1, wherein to separate the video the at least one processor is further configured to:
   determine a starting point and ending point for each segment of the plurality of segments; and
   insert an overlap portion at intersection between adjacent segments.

8. The apparatus of claim 1, wherein the at least one processor is further configured to:
   detect a bumper while scanning the undercarriage of the vehicle; and
   stop scanning of the undercarriage responsive to detection of the bumper.

9. The apparatus of claim 1, wherein the rover further defines a mobile telephone cradle for a mobile telephone providing the camera and the at least one processor.

10. A method for scanning an undercarriage of a vehicle, comprising:
   generating control signals to control movement of a rover and to control capture of a video of the undercarriage of the vehicle using at least one processor;
   moving the rover back and forth under the vehicle responsive to the control signals using a drive system for the rover;
   capturing the video of the undercarriage of the vehicle as the rover moves under the vehicle in a first direction using a camera;
   receiving the video from the camera of the undercarriage of the vehicle;
   separating the video from the camera into a plurality of segments, each of the segments including at least one portion that overlaps with an adjacent segment of the plurality of segments;
   processing each of the plurality of segments in parallel to generate a stacked image of each of the plurality of segments, the stacked image comprising a single image slice from each frame of a segment stacked together into the stacked image;
   connecting each of the stacked images together to generate a single stacked image of the undercarriage of the vehicle;
   dividing the single stacked image into a plurality of horizontal segments; and
   applying parabolic scaling factors to each of the plurality of horizontal segments of the single stacked image to generate a single image of the undercarriage of the vehicle.

11. The method of claim 10, wherein the step of generating the control signals further comprises:
   receiving an input to move the rover a predetermined distance under the vehicle using the at least one processor;
   determining a number of steps associated with the predetermined distance using the at least one processor; and
   generating a control signal to command the drive system to move the rover the determined number of steps using the at least one processor.

12. The method of claim 10, wherein the step of moving further comprises:
   associating a plurality of stepper motors with a plurality of wheels of the rover;
   receiving the control signals from the at least one processor; and driving the plurality of stepper motors using a plurality of motor drivers in response to the control signals from the at least one processor.

13. The method of claim 10 further comprising:
receiving a first image and a second image from the camera at the at least one processor;
determining static abnormalities and moving abnormalities associated with a lens of the camera responsive to processing of the first image and the second image; and
providing an indication of whether the lens is clean or dirty responsive to the determined static abnormalities and moving abnormalities.

14. The method of claim 10, wherein the step of processing each of the plurality of segments further comprises:
extracting a slice from substantially a center of each frame in a segment using the at least one processor; and
stacking each of the slices from the segment into the stacked image for the segment using the at least one processor, wherein each of the plurality of segments has a separate stacked image associated therewith.

15. The method of claim 10, wherein the step of performing parabolic scaling further comprises:
dividing the single stacked image into a plurality of horizontal slices using the at least one processor;
assigning a scaling factor to each of the plurality of horizontal slices using the at least one processor;
resizing each of the plurality of horizontal slices according to the assigned scaling factor using the at least one processor; and
reassembling the resized plurality of horizontal slices into a resized single stacked image using the at least one processor.

16. The method of claim 10, wherein the step of separating the video further comprises:
determining a starting point and ending point for each segment of the plurality of segments using the at least one processor; and
inserting an overlap portion at intersection between adjacent segments using the at least one processor.

17. The method of claim 10 further comprising:
detecting a bumper while scanning the undercarriage of the vehicle using the at least one processor; and
stopping scanning of the undercarriage responsive to detection of the bumper using the at least one processor.

18. The method of claim 10, wherein the parabolic scaling factors are one for a center horizontal slice of the plurality of horizontal segments and the scaling factors increase for each horizontal slice from a center toward each of the horizontal slices on a top horizontal edge and a bottom horizontal edge of the single stacked image.

19. An apparatus for scanning an undercarriage of a vehicle, comprising:
a rover for moving back and forth under the vehicle;
at least one processor for generating control signals to control movement of the rover and to control capture of a video of the undercarriage of the vehicle;
a drive system responsive to the control signals from the processor for moving the rover back and forth under the vehicle;
a camera for capturing the video of the undercarriage of the vehicle as the rover moves under the vehicle in a first direction; and
wherein the at least one processor is further configured to:
receive the video from the camera of the undercarriage of the vehicle;
separate the video from the camera into a plurality of segments, each of the segments including at least one portion that overlaps with an adjacent segment;
extract a slice from substantially a center of each frame in each of the plurality of segments; and
stack each of the slices from a segment into a stacked image for the segment, wherein each of the plurality of segments has a separate stacked image associated therewith;
connect each of the stacked images together to generate a single stacked image of the undercarriage of the vehicle;
divide the single stacked image into a plurality of horizontal slices;
assign a scaling factor to each of the plurality of horizontal slices, wherein the scaling factor is one for a center horizontal slice of the plurality of horizontal slices and the scaling factors increase for each horizontal slice from the center toward each of the horizontal slices on a top horizontal edge and a bottom horizontal edge of the single stacked image;
resize each of the plurality of horizontal slices according to the assigned scaling factor; and
reassemble the resized plurality of horizontal slices into a resized single stacked image.

20. The apparatus of claim 19, wherein the at least one processor is further configured to:
detect a bumper while scanning the undercarriage of the vehicle; and
stop scanning of the undercarriage responsive to detection of the bumper.

\* \* \* \* \*